(12) United States Patent
Pearl, Jr. et al.

(10) Patent No.: US 11,180,987 B2
(45) Date of Patent: Nov. 23, 2021

(54) CONDUCTIVE PATHWAYS WITHIN A WELLBORE USING NO-HEAT LIQUID SOLDER

(71) Applicant: Halliburton Energy Services, Inc., Houston, TX (US)

(72) Inventors: William Cecil Pearl, Jr., Spring, TX (US); Samuel J. Lewis, Spring, TX (US); Lonnie Carl Helms, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/746,501

(22) Filed: Jan. 17, 2020

(65) Prior Publication Data

US 2021/0222547 A1   Jul. 22, 2021

(51) Int. Cl.
| | |
|---|---|
| *E21B 47/12* | (2012.01) |
| *B23K 35/02* | (2006.01) |
| *B23K 35/30* | (2006.01) |
| *B23K 35/26* | (2006.01) |

(52) U.S. Cl.
CPC .......... *E21B 47/12* (2013.01); *B23K 35/0244* (2013.01); *B23K 35/262* (2013.01); *B23K 35/264* (2013.01); *B23K 35/3006* (2013.01); *B23K 35/3013* (2013.01)

(58) Field of Classification Search
CPC ............................ B23K 35/262; B23K 35/264; B23K 35/3006; B23K 35/3013; B23K 35/0244; E21B 47/12; E21B 47/13; E21B 47/26
See application file for complete search history.

(56) References Cited

U.S. PATENT DOCUMENTS

| | | | |
|---|---|---|---|
| 10,266,925 B2 * | 4/2019 | Thuo | B22F 7/064 |
| 2003/0058127 A1 | 3/2003 | Babour et al. | |
| 2004/0007389 A1 | 1/2004 | Zupanick | |
| 2004/0104045 A1 | 6/2004 | Larovere | |
| 2006/0037748 A1 | 2/2006 | Wardlaw et al. | |
| 2009/0229494 A1 | 9/2009 | Shah et al. | |
| 2012/0247765 A1 | 10/2012 | Agrawal et al. | |
| 2016/0137912 A1 * | 5/2016 | Sherman | E21B 43/267 166/280.2 |
| 2016/0258269 A1 * | 9/2016 | Musso | C04B 28/02 |
| 2017/0014958 A1 | 1/2017 | Thou et al. | |
| 2017/0081956 A1 | 3/2017 | Ganguly et al. | |
| 2017/0107419 A1 | 4/2017 | Roy et al. | |
| 2018/0258735 A1 | 9/2018 | Shafer | |

(Continued)

FOREIGN PATENT DOCUMENTS

WO   2017011029   1/2017

OTHER PUBLICATIONS

PCT Application No. PCT/US2020/014155, International Search Report and Written Opinion, dated Oct. 7, 2020, 12 pages.

(Continued)

*Primary Examiner* — Franklin D Balseca
(74) *Attorney, Agent, or Firm* — Kilpatrick Townsend & Stockton LLP (57) ABSTRACT

A conductive path can be formed using metal material coated with a layer that is controllably activated to release the metal material downhole in the wellbore. The conductive path can be used to communicate signals or power downhole in the wellbore.

20 Claims, 5 Drawing Sheets

(56) References Cited

U.S. PATENT DOCUMENTS

2018/0274333 A1    9/2018  Gibb
2020/0217191 A1*   7/2020  Hayes .................... C09K 8/04

OTHER PUBLICATIONS

PCT Application No. PCT/US2020/014159, International Search Report and Written Opinion, dated Oct. 7, 2020, 13 pages.
PCT Application No. PCT/US2020/014161, International Search Report and Written Opinion, dated Oct. 15, 2020, 12 pages.
PCT Application No. PCT/US2020/014164, International Search Report and Written Opinion, dated Oct. 15, 2020, 12 pages.
Cinar et al., "Mechanical Fracturing of Core-Shell Undercooled Metal Particles for Heat-Free Soldering", Scientific Reports, www.nature.com/scienfificreports, 6:21864, Feb. 23, 2016, 12 pages.
U.S. Appl. No. 16/746,469, Non-Final Office Action, dated Feb. 2, 2021, 16 pages.

* cited by examiner

CONDUCTIVE PATHWAYS WITHIN A WELLBORE USING NO-HEAT LIQUID SOLDER

TECHNICAL FIELD

The present disclosure relates generally to materials usable in a wellbore environment for completion processes. More specifically, this disclosure relates to metal material that can be controllably released in liquid form to create conductive metal paths downhole.

BACKGROUND

During completion of a well in a subterranean formation, casing may be added to the wellbore and cemented to seal and fix the casing in the wellbore. Perforations in the casing, cement, and formation may also be introduced during completion to enable efficient production of hydrocarbons from the formation.

Sensors and tools may be positioned downhole for various completion operations. Power and signals may be relayed to the sensors and tools using wireline technologies.

DETAILED DESCRIPTION

Certain aspects and examples of the present disclosure relate to use of a metal material coated with a layer allowing controlled activation to selectively create conductive paths within a wellbore that are used for subsequent wellbore operations, such as a wellbore completion operation. The conductive paths may be used for communicating with sensors positioned downhole, as a sensor itself, or for communicating power downhole for a wellbore operation. Wellbore completion may include processes associated with preparing a well in a subterranean formation for production of hydrocarbons. Examples of preparing the well for production include installing, sealing, or fixing a casing in place within the wellbore using a wellbore treatment material (e.g., cement or resin), evaluating or repairing damage to well equipment, such as a casing or cement, or the like. The metal material may comprise a metal or alloy that is in the liquid state prior to activation of the layer. The metal material may exist in an undercooled (sometimes referred to as a supercooled) liquid state because the presence of the coating layer can stabilize the metal material in the liquid state below its freezing/melting point. The layer can be controllably activated by breaking, dissolving, or otherwise disrupting the layer to allow the undercooled metal material in the liquid state to be released, after which it can solidify. Example techniques for activating the layer include, but are not limited to subjecting the layer to heat, ultrasonic energy, a magnetic field, an electric field, a compressive stress, a shear stress, or a chemical dissolution treatment.

Use of metal material coated with a layer that is controllably activated in a wellbore completion operation can allow for creation of conductive paths in desirable locations. In one example, conductive paths can be created within a casing cement. Such a path can be created, for example, by including the metal material in the casing cement during a cementing operation, and activating the layer to release the metal material in liquid form prior to the cement curing, such that the liquid metal material flows and solidifies to form a conductive path comprising solidified metal material within the cement. The cement can then be allowed to cure, fixing the casing in place in the wellbore and also fixing the conductive path in place within the cement. In some cases, the metal material may be included in a mixture comprising a carrier fluid, such as a suspension of particles of the metal material in a carrier fluid, which may be or comprise a wellbore treatment material, such as cement. The wellbore treatment material may be a fluid (e.g., a liquid or slurry mixture) and may be referred to as a wellbore treatment fluid. Example wellbore treatment fluids include cement slurries, liquid resin, spacer fluids, carrier fluids, etc. The wellbore treatment material may be a solid, which may be formed upon curing of a wellbore treatment fluid. Example solid wellbore treatment materials may include cured cement or cured resin. Particles of the metal material may have any suitable sizes, such as a diameter of from 3 nm to 10 μm, or any value within this range. The conductive path can be used as a communication path through the cement for downhole sensors, allowing signals to be exchanged with the downhole sensors, such as from the surface or from another downhole location, or to allow power to be delivered to the downhole sensor.

The conductive paths can be used for any desirable operation. In some examples, a conductive path in a casing cement can be used to electronically interrogate the cement. For example, the conductive path can itself indicate an integrity of the cement and identify damage within the cement. If the cement is damaged, a conductive path within the cement can also be damaged, such as where a break along the conductive path is created or where a resistance change occurs along the conductive path in the case of an incomplete break, for example. Such a break in the conductive path can be identified by probing a resistance of the conductive path between downhole locations or between the surface and a downhole location. In some cases, multiple separate conductive paths within a casing cement can be created, allowing for independent probing of the integrity of different portions of the cement. If these portions are created along different downhole depths, this can allow different sections of the casing cement to be evaluated, identifying locations where damage may exist.

In some examples, the conductive path can be used to provide power to a downhole tool, such as a tool used for a wellbore completion operation. In one example, the conductive path can be created within structural members of cementing accessory equipment, such as valves, plugs, float collars, float shoes, or the like, used for cementing the casing in place. This conductive path can be used, for example, to provide current to a pulsed power drilling operation, which can be used to drill up the cementing accessory equipment.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
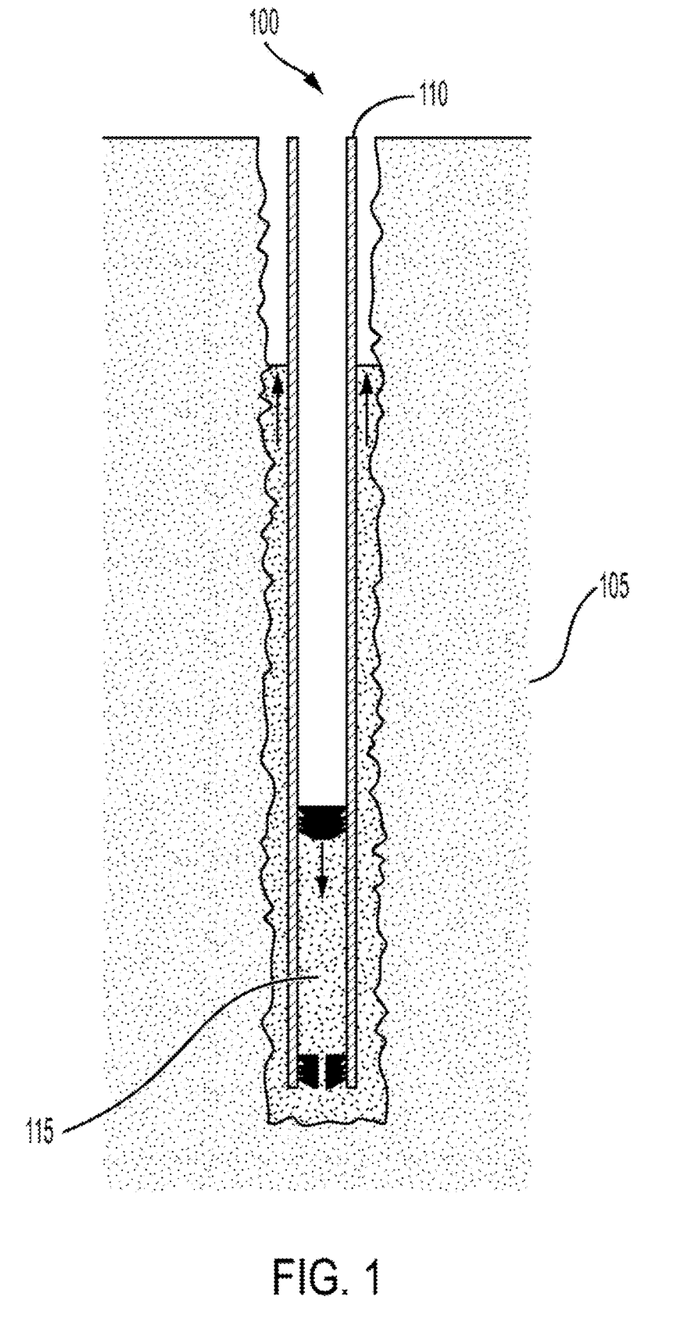
FIG. 1 is a schematic illustration depicting a wellbore completion operation according to one example of the present disclosure.

FIG. 1 is a schematic illustration depicting a wellbore 100 in which a completion operation is occurring according to one example. Wellbore 100 can extend through various earth strata and can extend through or to a hydrocarbon bearing subterranean formation 105. Although wellbore 100 is depicted in FIG. 1 as substantially vertical, other orientations for sections of wellbore 100 can be used, including curved, angled, or substantially horizontal. Wellbore 100 includes a casing string 110. A mixture 115 is used to fix casing string 110 in place within wellbore 110 as part of a completion operation. As illustrated, mixture 115 is directed downhole within the casing string using a pair of wiper plugs to force mixture 115 into an annular space between the wellbore 100 and the casing string 110.

Mixture 115 can comprise a wellbore treatment material, such as a cement slurry, and metal material coated with a layer that is controllably activated within the wellbore 100. By including metal material within mixture 115, aspects of the above features can be achieved, as will be described in more detail below.

Although FIG. 1 shows a single casing string 110, multiple casing strings can be used within wellbore 100, such as a surface casing string, an intermediate casing string, or a production casing string. In some cases, a liner suspended from inside the bottom of another casing string may be used. Further, various mixtures 115 can be used for wellbore completion operations other than cementing a casing string 110 or for well drilling operations. As examples, resins and polymers may also be used in mixture 115, such as for lost circulation material, as part of a cement sheath, for remediating an existing cement sheath, or the like.

The layer coating the metal material in mixture 115 can be activated during the process of fixing casing string 110 in place. For example, heat, ultrasonic energy, magnetic fields, electric fields, compressive or shear stress, or chemical dissolution treatment can be used to activate the layer so that liquid metallic material flows and solidifies to form a conductive path within mixture 115.

Figure 2:
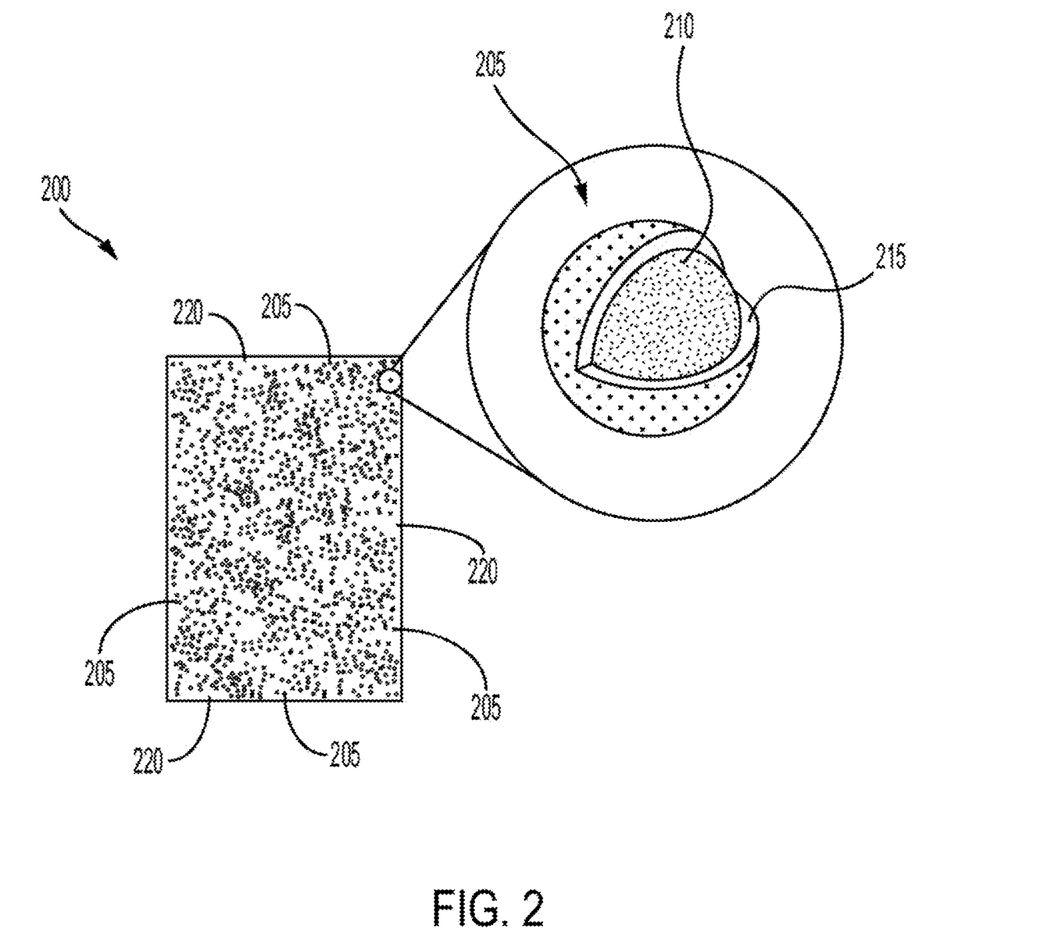
FIG. 2 is a schematic illustration of a mixture comprising a metal material according to one example of the present disclosure.

FIG. 2 is a schematic illustration of a mixture 200 comprising particles 205 of a metal material 210 according some examples of the present disclosure. Particles 205 may be described as having a core-shell particle structure with metal material 210 corresponding to a core and a layer 215 corresponding to a shell. The particles 205 of metal material 210 may be dispersed in, suspended in, or otherwise supported by a carrier fluid 220, which can be a wellbore treatment material. Metal material 210 may comprise a metal or alloy, in an undercooled liquid state, meaning that the metal material 210 in the particles 205 is a liquid, but is present at a temperature below the melting or solidus temperature of the metal material 210. Any suitable metal or alloy may be useful as the metal material 210, such as those metals or alloys having a melting or solidus temperature of less than about 100° C., less than about 200° C., or less than about 300° C. Optionally, a useful metal or alloy has a melting or solidus temperature greater than the temperature of a subterranean formation. In some examples, useful alloys include, but are not limited to, solder alloys, Field's metal (a eutectic alloy of bismuth, indium, and tin), Wood's metal (a eutectic alloy of bismuth, lead, tin, and cadmium), Cerrosafe (an alloy of bismuth, lead, tin, and cadmium), and Rose's metal (an alloy of bismuth, lead, and tin). Other alloys may be used, such as alloys comprising, consisting of, or consisting essentially of one or more of bismuth, lead, tin, indium, cadmium, thallium, gallium, zinc, copper, silver, gold, or antimony. Eutectic alloys comprising one or more of bismuth, lead, tin, indium, cadmium, thallium, gallium, zinc, copper, silver, gold, or antimony may also be used. Metals and alloys with melting temperatures as high as 500° C. can be used in some embodiments.

As shown in the inset in FIG. 2, the particles 205 of the metal material 210 may include a layer 215, which is schematically depicted in a partial cutaway view to show metal material 210 within layer 215. Layer 215 may be used as a stabilization layer or provide a stabilization effect, allowing metal material 210 to exist in the liquid state at temperatures below a melting or solidus temperature of metal material 210. Layer 215 may comprise one or more of a metal oxide, a chelated stabilizer, an organic adlayer, an inorganic adlayer, or an organic functional group. Example adlayers or functional groups that may be present on a surface of layer 215 may comprise acetate or phosphate. A specific example of layer 215 may comprise a metal oxide, such an oxide of the metal or alloy comprising the metal material 210 (e.g., a self-passivating oxide layer), optionally formed in-situ on the liquid metal material 210. The layer may include a chelated organic stabilizer on the surface thereof, such as a chelated acetate outer shell layer.

Particles of a metal material coated with such a layer may be generated by using a metal droplet emulsion technique. As an example, an amount of a liquid metal at a temperature above its melting or solidus point can be immersed in a dilute acid solution, such as a solution of ~2-5% acetic acid in diethylene glycol, and a rotating implement can be inserted into the mixture and rotated to generate a shearing force that separates small droplets, corresponding to particles 205, of the liquid metal which are coated with an oxide layer with a chelated stabilizing layer. The oxide layer and chelated stabilizing layer can serve to isolate the liquid metal from contacting nucleation sites, trapping the liquid metal in a metastable liquid state. Metals with higher melting temperatures can be used when the solution has suitable properties so that the solution stays in liquid form at the melting temperature of the metal. As examples, polyphenyl ether pump fluid or a variety of ionic liquids can be used, as these materials can have boiling temperatures as high as 500° C. or more. The resultant particles 205 can have any suitable dimensions. For example, particles 205 can have a diameter of from 3 nm to 10 µm, or any value within this range. Optionally, the particles 205 can be removed from the emulsion and concentrated to create large volumes of metal material in the form of particles 205. Optionally, the particles 205 can be suspended or dispersed in carrier fluid 220, which may be the same as the solution in which the particles 205 are created or may be a different fluid.

The layer 215, such as an oxide layer and chelated stabilizing layer, can be controllably activated to allow the metal material 210 inside to be controllably released in a liquid state, from which the metal material 210 can flow and then undergo a transformation to a solid state. Activation of layer 215 may include subjecting layer 215 to conditions that disrupt the oxide or chelated stabilizer, such as through mechanical or physical disruption or chemical or other dissolution. Example techniques for activating or controllably activating layer 215 include, but are not limited to, subjecting layer 215 to heat, ultrasonic energy, a magnetic field, an electric field, a compressive stress, a shear stress, or a chemical dissolution treatment. Advantageously, activation of layer 215 does not require the use of heat to allow metal material 210 to be in the liquid state upon activation, though heat may optionally be used to activate layer 215. Stated another way, since metal material 210 is already in the liquid state within layer 215, by disrupting layer 215, metal material 210 can be released in a liquid state without using heat to melt metal material 210 from a solid state to a liquid state. Further, layer 215 can be activated under ambient conditions or conditions within a wellbore or a formation, to release the metal material 210 in the liquid state.

Mixture 200 may also comprise a carrier fluid 220. For example, carrier fluid 220 may optionally comprise the continuous phase of the emulsion in which the particles 205 are created (e.g., a solution comprising ethylene glycol, an ionic liquid, a polyphenyl ether pump fluid) or another solvent (e.g., water, ethanol, methanol, a liquid hydrocarbon, etc.). Optionally, carrier fluid 220 is itself a mixture. For use in downhole operations in a wellbore, carrier fluid may optionally comprise, for example, an uncured cement or cement slurry, an uncured resin, an uncured polymeric material, a polymer precursor, a drilling mud, a spacer fluid, lost-circulation material, oil-based mud, water-based mud, or the like. Some carrier fluids may cure, change form, or otherwise change state as a function of time, such as curing of a cement to form cured cement, curing of a resin to form cured resin, or curing of a polymeric material or polymerization of a polymer precursor to form a cured polymeric material. In some cases, carrier fluid 220 may facilitate the activation of layer 215, such as by transferring heat, applying stress or strain, or transferring ultrasonic energy, for example.

A concentration of the metal material 210 or particles 205 in mixture 200 may vary depending on the particular application, and concentrations of from 5% by weight to 95% by weight may be used. Other example concentrations (percent by weight) of metal material 210 or particles 205 in mixture 200 include, but are not limited to, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, from 10% to 90%, from 10% to 40%, from 60% to 90%, etc.

In some cases, metal material 210 or particles 205 may settle out of carrier fluid 220, such as over time due to gravity. Metal material 210 or particles 205 may have a density or specific gravity that is higher than that of carrier fluid 220. In such a case, the mixture 200 can have an overall density or specific gravity that is higher than the carrier fluid without metal material 210 or particles 205. In some examples, a specific gravity for mixture 200 may range from 3 to 12. The specific gravity for mixture 200 can be a function of the composition of metal material 210, the composition of carrier fluid 220, and the concentration of metal material 210 in carrier fluid 220, for example.

Figure 3:
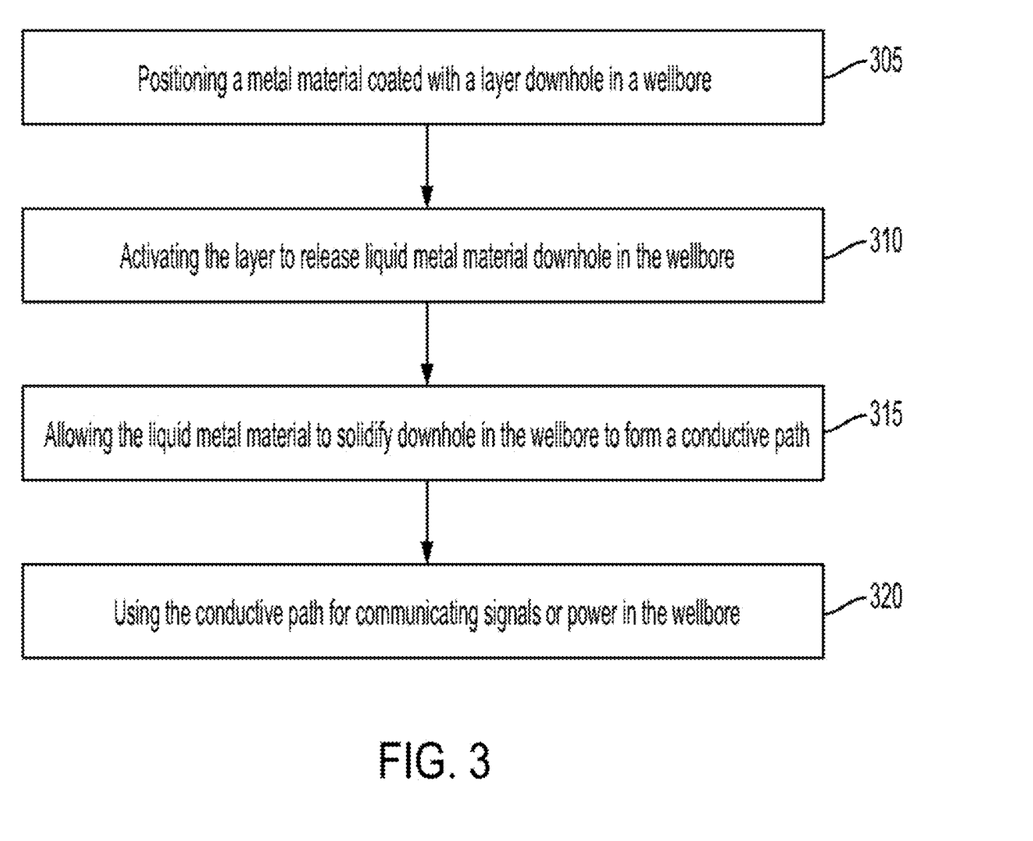
FIG. 3 is a flowchart providing an overview of an example of a method according to the present disclosure.

FIG. 3 is a flowchart providing an overview of an example method according to the present disclosure, such as a method for creating a conductive path within a wellbore. At block 305, a metal material coated with a layer that is controllably activated is positioned downhole in a wellbore. The mixture may comprise any of the mixtures described herein, such as mixture 115 or 200. The metal material may comprise any metal material described herein, such as metal material 210. The metal material may be in the form of or comprise particles, such as particles 205 in which metal material 210 is coated with layer 215. The metal material coated with the layer may be in a liquid state prior to being positioned downhole in the wellbore. The metal material may be in a mixture, suspension, or dispersion of a carrier fluid, such as a wellbore treatment material. Any suitable wellbore treatment material, such as wellbore treatment material described herein may be used, such as a cement slurry, a resin, a polymer, a polymer precursor, or the like). The wellbore treatment material or carrier fluid may be used to position the metal material downhole in the wellbore.

Optionally, the metal material can be manipulated prior to activation of the layer coating the metal material. For example, the metal material may interact with a magnetic field, which can be used to apply a force on the metal material. In some cases, the metal material can be manipulated to move to a surface of a carrier fluid in which the metal material is suspended or dispersed. Such an operation may allow for precise positioning of the metal material prior to activation of the layer.

At block 310, the layer can be activated to release the metal material in a liquid state downhole in the wellbore. Activation of the layer can allow liquid metal material to flow and create a conductive path downhole in the wellbore which can optionally be used for performing, or assisting in performing, a wellbore completion operation. Non-limiting examples of activating the layer include subjecting the metal material to one or more of heat, ultrasonic energy, magnetic fields, electric fields, compressive stress, shear stress, or chemical dissolution treatment.

At block 315, the metal material is allowed to solidify downhole in the wellbore to form the conductive path. As described above, the layer may allow the metal material to exist in a supercooled or undercooled condition in the mixture; that is, the metal material can be in a liquid form even though its temperature is less than the metal material's melting or solidus temperature. Upon activating the layer and releasing the metal material, the metal material can flow, in liquid form, for an amount of time and then the metal material may solidify, such as upon the metal material contacting another substance or object, which may initiate crystallization of the metal material in solid form and create a conductive path.

Figure 4:
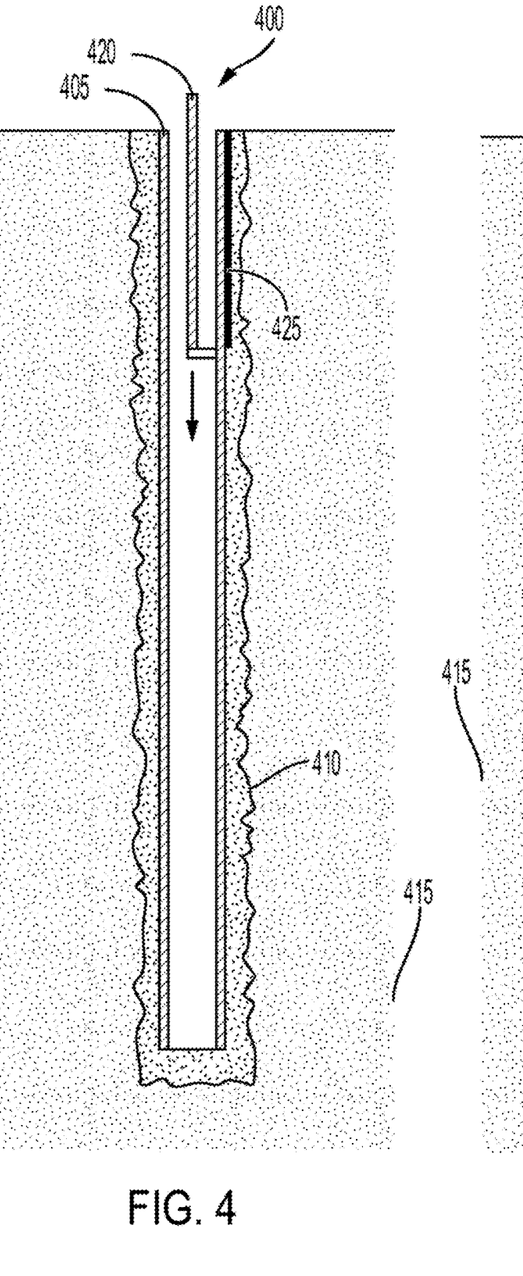
FIG. 4 is a schematic illustration depicting a conductive path being formed in a cement sheath according to one example of the present disclosure.

At block 320, the conductive path can be used for communicating signals or power (e.g., electrical power) in the wellbore. Non-limiting or optional uses of the conductive path include those described above. For example, the conductive path can be used for communicating with sensors. Optionally, the conductive path can be used to provide power to a downhole tool or downhole process, which can optionally comprise a well completion operation. In some embodiments, the conductive path can be used to interrogate the wellbore treatment material FIG. 4 provides a schematic illustration depicting a conductive path being formed in a cement sheath according to one example of the present disclosure. FIG. 4 shows a wellbore 400 with a casing string 405 and a mixture 410, such as a wellbore treatment mixture, in a formation 415. Mixture 410 comprises, for example, a cement and a metal material coated with a layer that is controllably activated within the wellbore 400. A tool string 420 is used in FIG. 4 to activate the layer and release metal material in liquid form to create a conductive path 425 comprising solid metal material. As illustrated, the tool string 420 is moved in a downhole direction as it activates the layer, creating the conductive path as it moves. Optionally, tool string 420 may include a magnet or electromagnet, which can be used to manipulate the metal material in mixture 410, such as to draw the metal material toward a surface of the mixture 410. Tool string 420 may include an element 440 for activating the layer, such as a heater, an electromagnet, an ultrasonic transducer, or the like. Although shown moving in a downhole direction while activating the layer to release metal material and create conductive path 425, tool string 420 can be moved in any suitable direction to create one or more conductive paths 425 or conductive path portions, as desired. In some embodiments, conductive path 425 can run along a partial or an entire length of wellbore 400. In some embodiments, different portions of conductive path 425 can run along different lengths, zones, or sections of wellbore 400. Optionally, multiple conductive paths 425 can make contact with surface devices.

Figure 5:
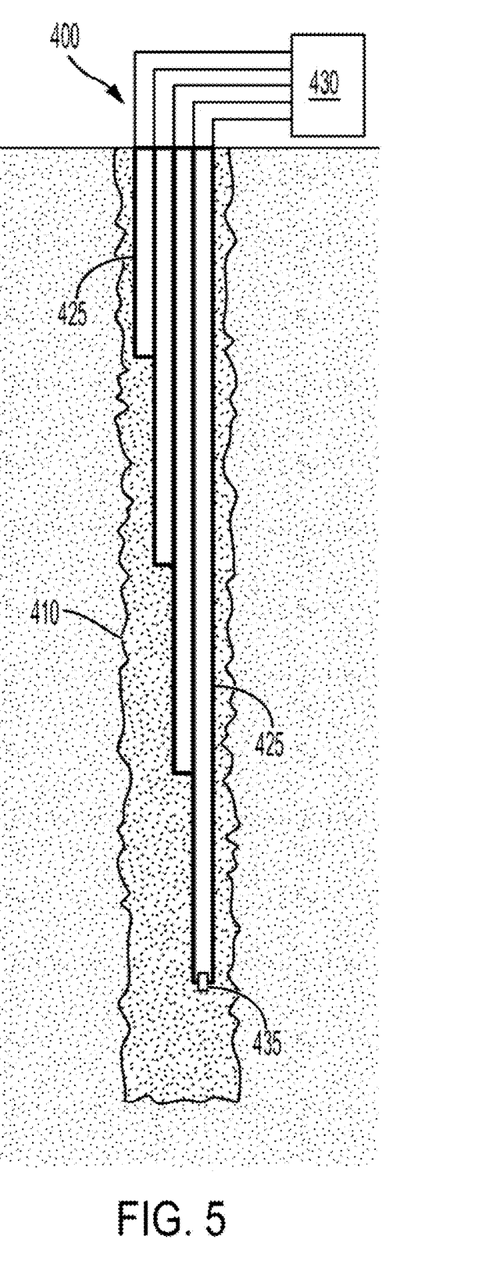
FIG. 5 is a schematic illustration depicting using a conductive path in a cement sheath for cement interrogation.

FIG. 5 is a schematic illustration depicting using a conductive path in a cement sheath for cement interrogation. FIG. 5 shows wellbore 400 and mixture 410 in formation 415. Although present in wellbore 400, casing string 405 is not shown in FIG. 5 so as not to obscure other details. Conductive path 425 is shown as a multi-component conductive path, allowing interrogation of different depths of running to different downhole positions of wellbore 400, with each component shown in separate data communication with a surface device 430. Surface device 430 can be or comprise a computing device, and can measure electrical conductivity between or along components of conductive path 425. Such a configuration can allow for the integrity of different depths of mixture 410 to be interrogated by surface device 430. Although components of conductive path 425 are shown in a side-by-side configuration in FIG. 5, such a configuration may represent or correspond to a circumferential positioning of components of conductive path 425 in mixture 410, such as spaced around casing string 405. Conductive path 425 can be positioned in electrical communication with a sensor 435, for example, to allow for communication signals and/or power to be relayed from sensor 435 to surface device 430.

Figure 6:
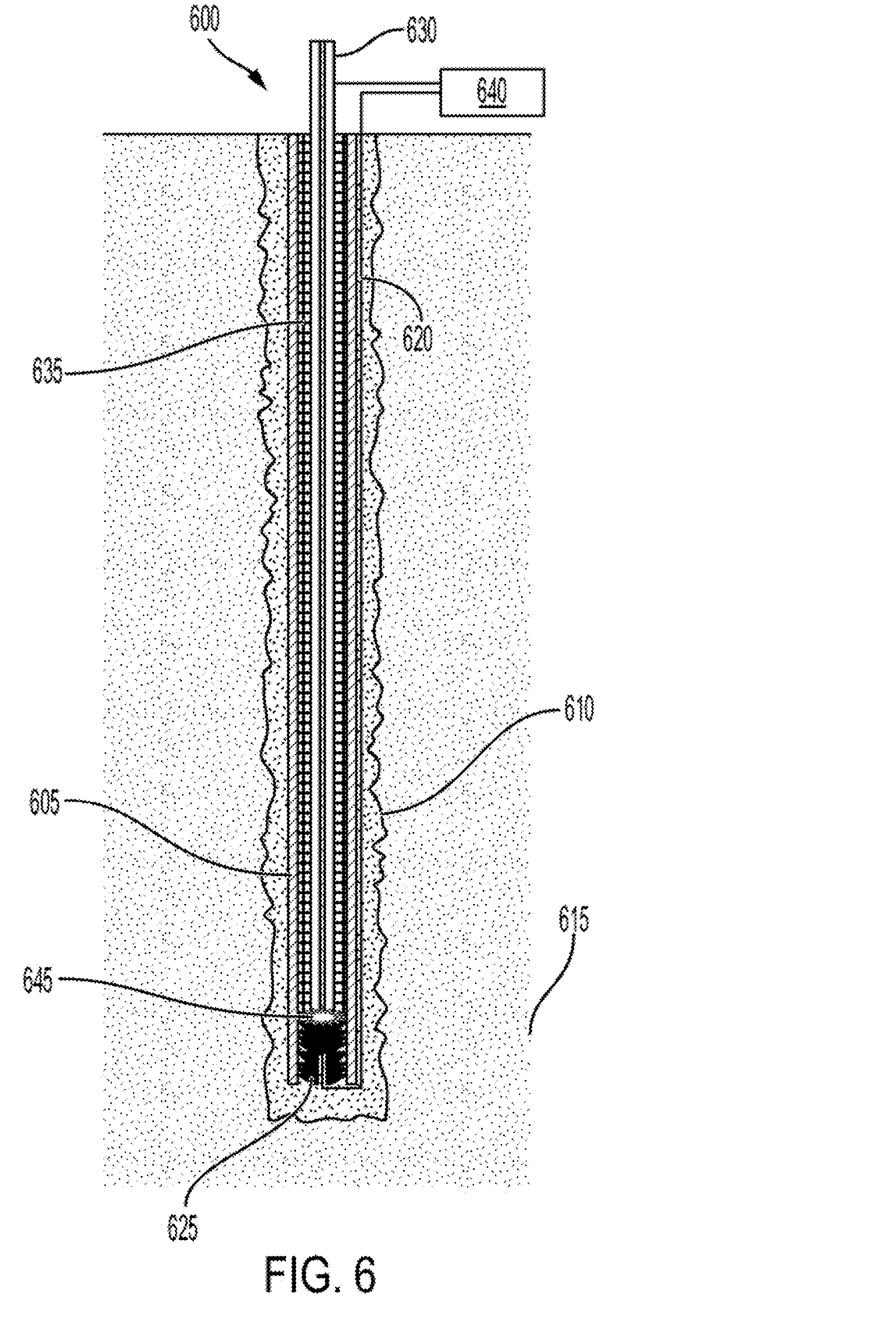
FIG. 6 is a schematic illustration of a wellbore in which a cementing accessory equipment is drilled up using a pulsed power drilling operation according to one example of the present disclosure.

FIG. 6 is a schematic illustration of a wellbore in which a cementing accessory equipment is drilled up using a pulsed power drilling operation according to one example of the present disclosure. FIG. 6 shows a wellbore 600 with a casing string 605 and a wellbore treatment mixture 610 (e.g., a mixture of cement and metal material) in a formation 615. A conductive path 620 is shown running from the surface to the bottom of casing string 605. Conductive path 620 is also present within cementing accessory equipment, here illustrated as plugs 625. Other cementing accessory equipment may also or alternatively be included in wellbore 600, such as float collars or float shoes, but are not depicted in FIG. 6.

A pulsed power drilling tool string 630 is positioned in wellbore 600 and is depicted as delivering a fluid 635, such as drilling mud, which is used as part of a pulsed power drilling operation. For the pulsed power drilling operation, a current or voltage is provided between the pulsed power drilling tool string 630 and conductive path 620, such as by surface device 640. The pulsed power drilling may use high-voltage electric pulses, which can create an arc or plasma 645 between conductive path 620 and an electrode on pulsed power drilling tool string 630, vaporizing materials at the location the arc or plasma 645, including portions of cement and plugs 625, effectively allowing drilling up of plugs 625 and other cementing accessory equipment.

In some aspects, mixtures, methods, and materials for wellbore completion operations are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: positioning a metal material in a wellbore, the metal material coated with a controllably activated layer; activating the layer to release the metal material downhole in the wellbore to form a conductive path in the wellbore; and using the conductive path for communicating signals or power in the wellbore.

Example 2 is the method of example 1, wherein the metal material is in a liquid state prior to being released downhole in the wellbore, and wherein activating the layer comprises subjecting the layer, at a downhole location, the layer to heat, ultrasonic energy, a magnetic field, an electric field, a compressive stress, a shear stress, or a chemical dissolution treatment to release the metal material in the liquid state into the wellbore at which the metal material changes to a solid state to form the conductive path.

Example 3 is the method of examples 1-2, wherein the conductive path is present in a wellbore treatment material within the wellbore, and wherein using the conductive path comprises electronically interrogating the wellbore treatment material via the conductive path or communicating signals or power to sensors in the wellbore via the conductive path.

Example 4 is the method of examples 1-3, wherein the metal material coated with the layer is present in wellbore treatment material within the wellbore prior to the layer being controllably activated, and wherein the method further comprises using a magnetic field to move the metal material coated with the layer to a surface of the wellbore treatment material prior to activating the layer to release the metal material.

Example 5 is the method of examples 1-4, wherein the conductive path is present in a cementing accessory equipment, and wherein using the conductive path comprises powering a pulsed power drilling operation for drilling up the cementing accessory equipment.

Example 6 is the method of examples 1-5, wherein the metal material comprises particles of the metal material in an undercooled liquid state coated with the layer, and wherein the layer comprises one or more of a metal oxide layer, an organic adlayer, an inorganic adlayer, or an organic functional group.

Example 7 is the method of examples 1-6, wherein the metal material comprises Field's metal, Wood's metal, Cerrosafe, Rose's metal, or an alloy or a eutectic alloy of one or more of bismuth, lead, tin, indium, cadmium, thallium, gallium, zinc, copper, silver, gold, or antimony.

Example 8 is a mixture comprising: a wellbore treatment material; and a metal material coated with a layer that is controllably activatable in a wellbore to release the metal material to form a conductive path for communicating signals or power through the wellbore treatment material.

Example 9 is the mixture of example 8, wherein the metal material is in a liquid state prior to activation of the layer, and wherein the layer is controllably activatable by subjecting, at a downhole location, the layer to heat, ultrasonic energy, a magnetic field, an electric field, a compressive stress, a shear stress, or a chemical dissolution treatment to release the metal material in the liquid state into the wellbore at which the metal material changes to a solid state to form the conductive path.

Example 10 is the mixture of examples 8-9, wherein (i) the signals correspond to an electronic interrogation of the wellbore treatment material via the conductive path or (ii)

the metal material provides the conductive path for communicating signals or power to sensors in the wellbore.

Example 11 is the mixture of examples 8-10, wherein the metal material coated with the layer is movable to a surface of the wellbore treatment material using a magnetic field prior to activating the layer to release the metal material.

Example 12 is the mixture of examples 8-11, wherein the conductive path is present in a cementing accessory equipment, and wherein the conductive path provides power to a pulsed power drilling operation for drilling up the cementing accessory equipment.

Example 13 is the mixture of examples 8-12, wherein the metal material comprises particles of the metal material in an undercooled liquid state coated with the layer, and wherein the layer comprises one or more of a metal oxide layer, an organic adlayer, an inorganic adlayer, or an organic functional group.

Example 14 is the mixture of examples 8-13, wherein the metal material comprises Field's metal, Wood's metal, Cerrosafe, Rose's metal, or an alloy or a eutectic alloy of one or more of bismuth, lead, tin, indium, cadmium, thallium, gallium, zinc, copper, silver, gold, or antimony.

Example 15 is a material comprising: a metal material; and layer coating the metal material, the layer being controllably activatable in a wellbore to release the metal material to generate a conductive path for communicating signals or power to or from a downhole location in the wellbore.

Example 16 is the material of example 15, wherein the metal material is in a liquid state prior to activation of the layer, and wherein the layer is controllably activatable by subjecting, at the downhole location, the layer to heat, ultrasonic energy, a magnetic field, an electric field, a compressive stress, a shear stress, or a chemical dissolution treatment to release the metal material in the liquid state into the wellbore at which the metal material changes to a solid state to form the conductive path.

Example 17 is the material of examples 15-16, wherein (i) the signals correspond to an electronic interrogation of a wellbore treatment material via the conductive path or (ii) the metal material provides the conductive path for communicating signals or power to sensors in the wellbore.

Example 18 is the material of examples 15-17, wherein the material is movable to a surface of a wellbore treatment material using a magnetic field prior to activating the layer to release the metal material.

Example 19 is the material of examples 15-18, wherein the conductive path is present in a cementing accessory equipment, and wherein the conductive path provides power to a pulsed power drilling operation for drilling up the cementing accessory equipment.

Example 20 is the material of examples 15-19, wherein the metal material comprises particles of the metal material in an undercooled liquid state coated with the layer, wherein the layer comprises one or more of a metal oxide layer, an organic adlayer, an inorganic adlayer, or an organic functional group, and wherein the metal material comprises Field's metal, Wood's metal, Cerrosafe, Rose's metal, or an alloy or a eutectic alloy of one or more of bismuth, lead, tin, indium, cadmium, thallium, gallium, zinc, copper, silver, gold, or antimony.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
   positioning a metal material in a wellbore, the metal material comprising particles of the metal material in an undercooled liquid state, coated with a controllably activated layer, and present in a wellbore treatment material within the wellbore prior to the controllably activated layer being controllably activated;
   using a magnetic field to move the metal material coated with the controllably activated layer to a surface of the wellbore treatment material prior to activating the controllably activated layer to release the metal material;
   activating the controllably activated layer to release the metal material in a liquid state downhole in the wellbore to form a conductive path in the wellbore, the conductive path comprising the released metal material in a solid state; and
   using the conductive path for longitudinally communicating signals or power in the wellbore.

2. The method of claim 1, wherein the metal material is in the liquid state prior to being released downhole in the wellbore, and
   wherein activating the layer comprises subjecting, at a downhole location, the layer to heat, ultrasonic energy, a magnetic field, an electric field, a compressive stress, a shear stress, or a chemical dissolution treatment to release the metal material in the liquid state into the wellbore at which the metal material changes to the solid state to form the conductive path.

3. The method of claim 1, wherein the conductive path is present in the wellbore treatment material within the wellbore, and
   wherein using the conductive path comprises electronically interrogating the wellbore treatment material via the conductive path or communicating signals or power to sensors in the wellbore via the conductive path.

4. The method of claim 1, wherein the layer comprises one or more of a metal oxide layer, an organic adlayer, an inorganic adlayer, or an organic functional group.

5. The method of claim 1, wherein the metal material comprises Field's metal, Wood's metal, Cerrosafe, Rose's metal, or an alloy or a eutectic alloy of one or more of bismuth, lead, tin, indium, cadmium, thallium, gallium, zinc, copper, silver, gold, or antimony.

6. A mixture comprising:
   a wellbore treatment material; and
   a metal material coated with a layer that is controllably activatable in a wellbore to release the metal material to form a conductive path for longitudinally communicating signals or power through the wellbore treatment material, the metal material comprising particles of the metal material in an undercooled liquid state coated with the layer prior to activation of the layer, the metal material solidifying after activation to form the conductive path, the metal material coated with the layer is movable to a surface of the wellbore treatment material using a magnetic field prior to activating the layer to release the metal material.

7. The mixture of claim 6, wherein the metal material is in a liquid state prior to activation of the layer, and
   wherein the layer is controllably activatable by subjecting, at a downhole location, the layer to heat, ultrasonic energy, a magnetic field, an electric field, a compressive stress, a shear stress, or a chemical dissolution treatment to release the metal material in the liquid state into the wellbore at which the metal material changes to a solid state to form the conductive path.

8. The mixture of claim 6, wherein (i) the signals correspond to an electronic interrogation of the wellbore treatment material via the conductive path or (ii) the metal material provides the conductive path for communicating signals or power to sensors in the wellbore.

9. The mixture of claim 6, wherein the layer comprises one or more of a metal oxide layer, an organic adlayer, an inorganic adlayer, or an organic functional group.

10. The mixture of claim 6, wherein the metal material comprises Field's metal, Wood's metal, Cerrosafe, Rose's metal, or an alloy or a eutectic alloy of one or more of bismuth, lead, tin, indium, cadmium, thallium, gallium, zinc, copper, silver, gold, or antimony.

11. A material comprising:
a metal material; and
a layer coating the metal material, the layer being controllably activatable in a wellbore to release the metal material to generate a conductive path for longitudinally communicating signals or power in the wellbore, the metal material comprising particles of the metal material in an undercooled liquid state coated with the layer prior to activation of the layer, the conductive path comprising the released metal material in a solid state after activation of the layer, wherein the material is movable to a surface of a wellbore treatment material using a magnetic field prior to activating the layer to release the metal material.

12. The material of claim 11, wherein the metal material is in a liquid state prior to activation of the layer, and
wherein the layer is controllably activatable by subjecting, at a downhole location, the layer to heat, ultrasonic energy, a magnetic field, an electric field, a compressive stress, a shear stress, or a chemical dissolution treatment to release the metal material in the liquid state into the wellbore at which the metal material changes to the solid state to form the conductive path.

13. The material of claim 11, wherein (i) the signals correspond to an electronic interrogation of the wellbore treatment material via the conductive path or (ii) the metal material provides the conductive path for communicating signals or power to sensors in the wellbore.

14. The material of claim 11, wherein the layer comprises one or more of a metal oxide layer, an organic adlayer, an inorganic adlayer, or an organic functional group, and wherein the metal material comprises Field's metal, Wood's metal, Cerrosafe, Rose's metal, or an alloy or a eutectic alloy of one or more of bismuth, lead, tin, indium, cadmium, thallium, gallium, zinc, copper, silver, gold, or antimony.

15. A method comprising:
positioning a metal material in a wellbore, the metal material comprising particles of the metal material in an undercooled liquid state and coated with a controllably activated layer;
activating the controllably activated layer to release the metal material in a liquid state downhole in the wellbore to form a conductive metal path in the wellbore, the conductive metal path comprising the released metal material in a solid state; and
using the conductive metal path for longitudinally communicating power in the wellbore, wherein the conductive metal path is present in cement in the wellbore, and wherein using the conductive metal path comprises powering a tool or a sensor at a downhole position in the wellbore.

16. The method of claim 15, wherein using the conductive metal path includes powering the tool for use in a wellbore completion operation.

17. The method of claim 15, wherein using the conductive metal path for longitudinally communicating power in the wellbore includes using the conductive metal path for providing high-voltage electric pulses to the tool positioned downhole in the wellbore.

18. The method of claim 15, wherein using the conductive metal path includes powering a pulsed power drilling operation.

19. The method of claim 15, wherein activating the controllably activated layer to release the metal material in the liquid state downhole in the wellbore forms multiple conductive metal paths in the wellbore, and wherein using the conductive metal path for longitudinally communicating power in the wellbore includes using a first conductive metal path to transmit power to the sensor or tool positioned in the wellbore and using a second conductive metal path to transmit the power back to a surface of the wellbore.

20. The method of claim 15, wherein activating the controllably activated layer to release the metal material in the liquid state downhole in the wellbore forms multiple conductive metal paths in the wellbore, wherein using the conductive metal path for longitudinally communicating power in the wellbore includes using a first conductive metal path to transmit power through the cement to the downhole position and using a second conductive metal path to transmit the power back to a surface of the wellbore through the cement, wherein the multiple conductive metal paths function as a cement sensor.

* * * * *